United States Patent
Xie et al.

(10) Patent No.: US 8,082,365 B1
(45) Date of Patent: Dec. 20, 2011

(54) METHOD OF USING WHOLE DIGITAL CODE TO ASSIGN ADDRESS FOR COMPUTER

(76) Inventors: Kenping Xie, Shanghai (CN); Mengen Wei, Shanghai (CN)

( * ) Notice: Subject to any disclaimer, the term of this patent is extended or adjusted under 35 U.S.C. 154(b) by 0 days.

(21) Appl. No.: 09/763,246

(22) PCT Filed: Oct. 25, 1999

(86) PCT No.: PCT/CN99/00166
§ 371 (c)(1),
(2), (4) Date: Feb. 20, 2001

(87) PCT Pub. No.: WO00/34884
PCT Pub. Date: Jun. 15, 2000

(30) Foreign Application Priority Data

Dec. 4, 1998 (CN) .................................. 98 1 22785

(51) Int. Cl.
*G06F 15/16* (2006.01)
(52) U.S. Cl. ........................................ 709/245; 709/236
(58) Field of Classification Search ................... 709/245
See application file for complete search history.

(56) References Cited

U.S. PATENT DOCUMENTS

| | | | |
|---|---|---|---|
| 6,014,711 A * | 1/2000 | Brown | 709/245 |
| 6,061,738 A * | 5/2000 | Osaku et al. | 709/245 |
| 6,070,154 A * | 5/2000 | Tavor et al. | 705/55 |
| 6,178,455 B1 * | 1/2001 | Schutte et al. | 709/228 |
| 6,243,443 B1 * | 6/2001 | Low et al. | 379/88.17 |
| 6,594,254 B1 * | 7/2003 | Kelly | 370/352 |
| 2001/0027478 A1 * | 10/2001 | Meier et al. | 709/206 |
| 2002/0091754 A1 * | 7/2002 | Jang et al. | 709/203 |

* cited by examiner

*Primary Examiner* — Patrice Winder
(74) *Attorney, Agent, or Firm* — Hamre, Schumann, Mueller & Larson, P.C.

(57) ABSTRACT

This invention relates to a method for assigning addresses to online computers by using full digital code. The method constitutes using a full digital coding address ("FDCA"), which is the combination of an online number, telephone number and category number. An E-mail box address, which is composed of a user name digital number and a domain name digital number of the mailbox server where the mailbox is located, can also be assigned using the FDCA. The E-mail box can be accessed, or the Internet can be browsed, by inputting to the modem of the computer by dialing up a keyboard of a dial-up telephone or the keyboard of the computer; by linking the corresponding digital code; and by converting the digital code with dedicated software. The method is easy to remember and administer, and the assigned addresses are unique.

13 Claims, No Drawings

METHOD OF USING WHOLE DIGITAL CODE TO ASSIGN ADDRESS FOR COMPUTER

FIELD OF THE INVENTION

This invention relates to a method for assigning addresses to online computers, especially, it relates to the method of assigning addresses to online computers in the form of full digital code.

BACKGROUND OF THE ART

With the rapid development of technology, the world has entered into the information era of data communication. The Internet, which was established by the U.S.A. in 1968 and is considered to be the pioneer of the information highway, is the most famous one among the data networks of the world. By now, a great number of countries and areas have joined the Internet family. China already has several international gateways linking with the Internet—the biggest international web in the world—and the number of user terminals is increasing at a remarkable speed.

In order to transfer information correctly to its destination on the Internet, each computer connected to the Internet must have one unique address. For the time being, there are three kinds of address coding solutions currently in use internationally and domestically. One is the IP address, which is constituted of four fields of digits separated by decimal points; another is the "domain name", which normally is constituted of not more than five sets of character strings separated by decimal points; and the last one is the "Chinese domain name hierarchy system", which is constituted of three levels of domain names separated by decimal points and a slash. Although the above address coding solutions can assign each online computer one unique address, they all have the shortcomings of complexity, lack of unity and difficulty of remembering and inputting.

An IP (Internet Protocol) address is a unique global indicator for a particular host computer connected to the Internet. An IP address is in the form of a 32-bit binary address and is usually expressed by a series of denary (base ten) numbers and dots for conciseness. An example of an IP address is 210.38.128.33. The binary address is easy for machines to identify but difficult for humans to remember.

Domain names were developed for the purpose of human convenience. Domain names are composed of language characters, such as letters, numbers and symbols representing the characteristics of the host computer. Domain names correspond to IP addresses. When an operator inputs the domain name of a particular host computer, the domain name will be resolved to generate the corresponding binary IP address, which will be used by the machine to locate and connect to the particular host computer (network entity) having that particular IP address and domain name.

A domain name is sometimes known as a network address, since it is an indicator designed to enable the operators' use of the network resources easier. As such, domain names can be regarded as a dedicated tool for the (human) operator, with the IP address being the real address used by the Internet. Accordingly, a domain name is a logical concept and does not reflect the physical location of the host computer within the Internet.

A domain name server is used to resolve a domain name, that is, to convert the domain name to an IP address, where the domain name is composed of characters and the IP address is a binary address, with the composition of the domain name conforming to the structure of the Internet name. In an IP address, the network entity is considered to be the bottom layer and the operator to be the top layer. As such, the domain name is above than IP address and between the IP address and the operators. According to the layer structure defined above, the order from the top layer (operator) to the bottom layer (network entity) is as follows: operator, domain name, IP address and network entity.

However, with the expansion of the network, domain names have become more and more complex and sometimes difficult to remember. Network bynames—composed of simple and recognizable symbols or characters to further prompt the operators—have therefore also been developed. When a network byname is inputted by the operator, the network byname is first mapped to a domain name, and the domain name then further resolved to find the IP address. According to the layer structure defined above, the network byname lies above the domain name and the order from the top layer (operator) to the bottom layer (network entity) is as follows: operator, network byname, domain name, IP address and network entity.

Further consideration is now being given to accessing an E-mail box, or browsing the Internet an a simple manner which is easy to remember and administer, while allowing each assigned address to be unique. In particular, attention is directed to a method for assigning addresses to online computers, especially, to the method of assigning addresses to online computers in the form of full digital code.

SUMMARY OF THE INVENTION

The purpose of this invention is to overcome the shortcomings of the current online computer address coding solutions mentioned above. This invention offers a solution of full digital coding, which is simple, easy to use, and easy to remember, which can be input not only by using a computer keyboard, but also by accessing an E-mail box using the telephone keyboard input and by browsing the Internet.

The technical project to implement this invention utilizes the solution for assigning addresses to online computers using full digital code. It has the following characteristics: it is constituted of a full digital code address, which is composed of an online number, a telephone number, and a category number.

Here, the online number refers to a digital number of the established network site, which is specified by the country or area; the telephone number includes the combination of the IDDD code of the user's country, the area code of the domestic DDD of the user's area, and the telephone number of the user's company or home; and the category number is the digital number specified by the country or area, respectively, for uniformly demarcating the business category.

A method is disclosed for accessing an E-mail box and browsing the Internet by using the coded addresses of the above solution, wherein: the E-mail box can be accessed, or the Internet can be browsed, by inputting into the modem of the computer by dialing a keyboard of a dial-up telephone or typing into a computer keyboard; by linking the corresponding digital code; and by converting the digital code with dedicated software.

The full digital code address (FDCA) can be translated by the dedicated interpreting software into an IP address, a domain name, or a Chinese hierarchy system domain name, and each such address corresponds appropriately to only one existing IP address, domain name, or Chinese hierarchy system domain name.

Once the above-mentioned technical project is adopted according to this invention, accessing an E-mail box, or browsing the Internet will be simple and easy to remember and administer, while each assigned address will be unique.

DESCRIPTION OF THE PREFERRED EMBODIMENTS

The advantages and the features of this invention will be explained further by the following embodiment.

The solution for assigning addresses to online computers uses full digital code: the full digital code address ("FDCA") being composed of the online number, the telephone number, and the category number. The online number refers to the digital number of the established network site that is specified by the country or area. For example, the online number of "Shanghai hotline" of Shanghai, China is "8888". The telephone number includes the combination of the IDDD code of the country where the user is located; the area code of the domestic DDD of the user's area; and the telephone number of the user's company or home. For example, for the telephone number "008602162572047", "0086" is China's IDDD code, "021" is the area code of the domestic DDD code for Shanghai, and "62572047" is the user's telephone number. The combination of these three parts of the numbers makes up the "telephone number" part of the FDCA. This is the key point of FDCA, it is simple, and easy to remember, and will never be repeated. The category number is the digital number specified by the country or area, respectively, for uniformly demarcating the business category. This part of the digital number can be set according to the regulations of the user's country or area, or the network site. It can be specified as big categories or subcategories, though usually only the big categories are specified. When the big category is specified by the method of term selection, the subcategory digital number can be directed to be after the category numbers. In practice, if some clients want their addresses to be encrypted, the encrypted digital number can also be directed to be after the online number of the telephone number. This encrypted number can be proposed by the client himself and, of course, must be registered first by the address coding organization. The client only has to input continuously all of the correct numbers either by telephone dial up or computer keyboard input, which is not only convenient but also quick and efficient to get online after linking.

Taking into consideration that a lot of users go online solely for the purpose of sending or receiving the E-mails, indeed, some users apply only for the E-mail operation mode, when a user applies for an Internet account number, the Internet service provider always offers him an E-mail box. The name of this E-mail box is usually composed of three parts, that is, the user's name, the mail server and the symbol "@". Usually, a character string is used to express this name. For the purpose of ease of input uniformly, the addresses of the E-mail boxes can also be coded by a full digital code, which is composed of the user name digital number and the digital number of the domain name of the mail server where the mail box is located.

When the E-mail box is accessed and the Internet is browsed using the above coding solution, the E-mail box can be accessed, or the Internet can be browsed, by inputting to the modem of the computer by dialing up a keyboard of a dial-up telephone or the keyboard of the computer; by linking the corresponding digital code; and by converting the digital code with a dedicated software. In order to be in common use worldwide, it is necessary to set up a converter which can enable the digital addresses of this invention to correspond appropriately to the existing Internet domain names and IP addresses. This converter is composed of interpreting software. Once a FDCA is designated, it can be converted into a respective IP address, or a domain name, or a Chinese hierarchy system domain name, and each FDCA corresponds to only one existing IP address, or a domain name, or a Chinese hierarchy system domain name. Because the computer can only recognize IP address, therefore, in the utilization of this invention, except establishing a converter to convert the FDCA into the worldwide universal domain name and IP address, a server must be designated to interpret the FDCA of this invention into an IP address, so that the computer can recognize and function.

This invention is suitable for coding the online user address of various networks. Computers from mode 486 and up and its adaptable modem can be used as the user terminal. In the application, not only the software of the operation system is used, but also support of the appropriate dialing software is needed.

This invention provides a solution that not only assigns a fixed static address to each online computer, but also assigns a dynamic address to any temporary online computer.

To make it convenient for users to use the digital address of the invention, this invention provides an auxiliary information database. The FDCA of this invention and the established online addresses, including the domain names, IP addresses and Chinese hierarchy system domain name, are listed respective with each other. These addresses can be up-loaded into the network sites. Once the database is opened by the user, the required online address can be inquired into, the users being enabled to choose a more convenient input way when getting online. The information in this database can also be compiled into files and be provided to the users for reading and inquiring into.

The invention claimed is:

1. A method for assigning a unique full digital code address (FDCA) to an application software on an online computer, comprising:

assigning to said application software the FDCA that is adapted to replace IP address-domain name address coding solutions, the FDCA comprising an online number comprising:

a digital number of an established network site, which is predetermined by a country or area;

a telephone number comprising a country code designating the country where a user of the application software online computer is located, an area code designating the area where the user is located, and a telephone number of the user; and a category number comprising a digital number predetermined by the country or the area for uniformly demarcating a business category, and identifying said application software in the network only by the FDCA on a network layer without converting the FDCA to an IP address.

2. The method of claim 1, wherein the method is capable of not only assigning a fixed static address to each online computer, but also assigning a dynamic address to any temporary online computer.

3. The method of claim 1 further comprising accessing an E-mail box by dialing a telephone keyboard to input the FDCA into a modem of the computer, linking to the FDCA, and converting the FDCA by using dedicated software.

4. The method of claim 1 further comprising browsing the internet by dialing up a keyboard of a dial-up telephone to input the FDCA into a modem of the computer, linking to the FDCA, and converting the FDCA by using dedicated software.

5. The method of claim 1 further comprising accessing an E-mail box by inputting the FDCA into a keyboard of the computer, linking to the FDCA, and converting the FDCA by using dedicated software.

6. The method of claim 1 further comprising browsing the Internet by inputting the FDCA into a keyboard of the computer, linking to the FDCA, and converting the FDCA by using dedicated software.

7. The method of claim 1 further comprising converting the FDCA into an IP address by using dedicated interpreting software, whereby the FDCA corresponds appropriately to one existing IP address.

8. The method of claim 1 further comprising converting the FDCA into a domain name by using dedicated interpreting software, whereby the FDCA corresponds appropriately to one existing domain name.

9. The method of claim 1 further comprising converting the FDCA into a Chinese hierarchy system domain name by using dedicated interpreting software, whereby the FDCA corresponds appropriately to one existing Chinese hierarchy system domain name.

10. The method of claim 1 further comprising assigning a subcategory number following the category number.

11. The method of claim 1 further comprising assigning an encrypted digital number following the online number.

12. The method of claim 1 further comprising assigning an address to a mail box, wherein the mail box address comprises a user name digital number and a domain name of a mail server where the mail box is located.

13. A method for assigning a unique full digital code address (FDCA) to application software on each of a plurality of computers in a network, comprising:

creating the FDCA that is adapted to replace IP address-domain name address coding solutions for the application software on each of the computers, each FDCA comprising a plurality of decimal digits for indicating respectively:

1) an online number,
2) a telephone number, and
3) a category number, the online number, the telephone number and the category number being distinct from each other, the online number comprising a predetermined digital number for an established network site, the telephone number comprising a country code and an area code designating respectively a country and area where the computer is located, and a telephone number of a user of the computer, the category number comprising a predetermined digital number for uniformly demarcating a business category;

assigning one of the FDCAs to a respective application software on one of the computers; and identifying the application software on the computers in the network only by the FDCAs on a network layer without converting the FDCA to an IP address.

* * * * *

(12) EX PARTE REEXAMINATION CERTIFICATE (10236th)
United States Patent
Xie et al.

(10) Number: US 8,082,365 C1
(45) Certificate Issued: Jul. 31, 2014

(54) METHOD OF USING WHOLE DIGITAL CODE TO ASSIGN ADDRESS FOR COMPUTER

(76) Inventors: Kenping Xie, Shanghai (CN); Mengen Wei, Shanghai (CN)

Reexamination Request:
No. 90/020,056, May 15, 2013

Reexamination Certificate for:
Patent No.: 8,082,365
Issued: Dec. 20, 2011
Appl. No.: 09/763,246
Filed: Feb. 20, 2001

(21) Appl. No.: 90/020,056

(22) PCT Filed: Oct. 25, 1999

(86) PCT No.: PCT/CN99/00166
§ 371 (c)(1),
(2), (4) Date: Feb. 20, 2001

(87) PCT Pub. No.: WO00/34884
PCT Pub. Date: Jun. 15, 2000

(30) Foreign Application Priority Data

Dec. 4, 1998 (CN) .................................. 98 1 22785

(51) Int. Cl.
*G06F 15/16* (2006.01)

(52) U.S. Cl.
USPC ........................................... 709/245; 709/236

(58) Field of Classification Search
None
See application file for complete search history.

(56) References Cited

To view the complete listing of prior art documents cited during the proceeding for Reexamination Control Number 90/020,056, please refer to the USPTO's public Patent Application Information Retrieval (PAIR) system under the Display References tab.

*Primary Examiner* — Joshua Campbell

(57) ABSTRACT

This invention relates to a method for assigning addresses to online computers by using full digital code. The method constitutes using a full digital coding address ("FDCA"), which is the combination of an online number, telephone number and category number. An E-mail box address, which is composed of a user name digital number and a domain name digital number of the mailbox server where the mailbox is located, can also be assigned using the FDCA. The E-mail box can be accessed, or the Internet can be browsed, by inputting to the modem of the computer by dialing up a keyboard of a dial-up telephone or the keyboard of the computer; by linking the corresponding digital code; and by converting the digital code with dedicated software. The method is easy to remember and administer, and the assigned addresses are unique.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1, 2 and 10-13 is confirmed.

Claims 3-9 are cancelled.

\* \* \* \* \*